(12) United States Patent
Gutierrez

(10) Patent No.: US 8,590,559 B1
(45) Date of Patent: Nov. 26, 2013

(54) LEAK DETECTOR ASSEMBLY

(76) Inventor: Ezequiel Gutierrez, Ontario, CA (US)

( * ) Notice: Subject to any disclaimer, the term of this patent is extended or adjusted under 35 U.S.C. 154(b) by 57 days.

(21) Appl. No.: 13/478,112

(22) Filed: May 23, 2012

(51) Int. Cl.
*E03D 11/00* (2006.01)
*F16K 23/00* (2006.01)

(52) U.S. Cl.
USPC ............ 137/312; 222/108; 4/251.1; 220/571; 200/61.04; 340/605

(58) Field of Classification Search
USPC ............ 137/312; 222/108, 109, 111; 4/251.1; 220/571; 200/61.04; 73/40.5 R; 340/686.1, 605, 616
See application file for complete search history.

(56) References Cited

U.S. PATENT DOCUMENTS

| | | | |
|---|---|---|---|
| 2,432,367 A * | 12/1947 | Andresen | 200/61.04 |
| 4,368,640 A | 1/1983 | Tokarz | |
| 5,131,264 A | 7/1992 | Jensen | |
| 5,927,142 A | 7/1999 | Mercer | |
| 5,967,171 A * | 10/1999 | Dwyer, Jr. | 137/312 |
| 6,414,598 B2 | 7/2002 | Freill et al. | |
| 6,523,562 B2 * | 2/2003 | Harper | 137/312 |
| 6,851,314 B2 | 2/2005 | Bromley | |
| 6,950,032 B1 * | 9/2005 | Hewitt et al. | 340/686.1 |
| D511,703 S | 11/2005 | Moyer | |
| 7,082,959 B1 * | 8/2006 | Franklin | 137/312 |
| 7,753,071 B2 * | 7/2010 | Wood | 137/312 |
| 8,061,380 B1 * | 11/2011 | Martin et al. | 137/312 |
| 8,468,875 B1 * | 6/2013 | Gutierrez | 73/40.5 A |

* cited by examiner

*Primary Examiner* — Kevin Lee

(57) ABSTRACT

A leak detector assembly uses fluid collected from a leaking conduit to automatically prohibit flow. The assembly includes a housing having a bottom, a top and a perimeter wall extending between the bottom and the top. A basin is coupled to the top of the housing. A drain opening is positioned in the basin. A collection pan is positioned below the drain opening to collect fluids passed through the drain opening from the basin. An electrical circuit is coupled to the collection pan. A sponge is coupled to the collection pan positioned over and contacting spaced contacts whereby the sponge completes the electrical circuit when the sponge becomes wet. A stop valve is coupled to a fluid conduit providing fluid to a position over the basin. The stop valve is operationally coupled to the electrical circuit whereby the stop valve closes upon the electrical circuit being completed.

11 Claims, 6 Drawing Sheets

LEAK DETECTOR ASSEMBLY

BACKGROUND OF THE DISCLOSURE

Field of the Disclosure

The disclosure relates to leak detecting devices and more particularly pertains to a new leak detecting device for using fluid collected from a leaking conduit to automatically prohibit flow within the conduit upon detection of a leak.

SUMMARY OF THE DISCLOSURE

An embodiment of the disclosure meets the needs presented above by generally comprising a housing having a bottom, a top and a perimeter wall extending between the bottom and the top to define an interior space. A basin is coupled to the top of the housing. A drain opening is positioned in the basin. A collection pan is positioned below the drain opening to collect fluids passed through the drain opening from the basin. An electrical circuit is coupled to the collection pan. A sponge is coupled to the collection pan positioned over and contacting spaced contacts whereby the sponge completes the electrical circuit when the sponge becomes wet. A stop valve is coupled to a fluid conduit providing fluid to a position over the basin. The stop valve is operationally coupled to the electrical circuit whereby the stop valve closes upon the electrical circuit being completed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
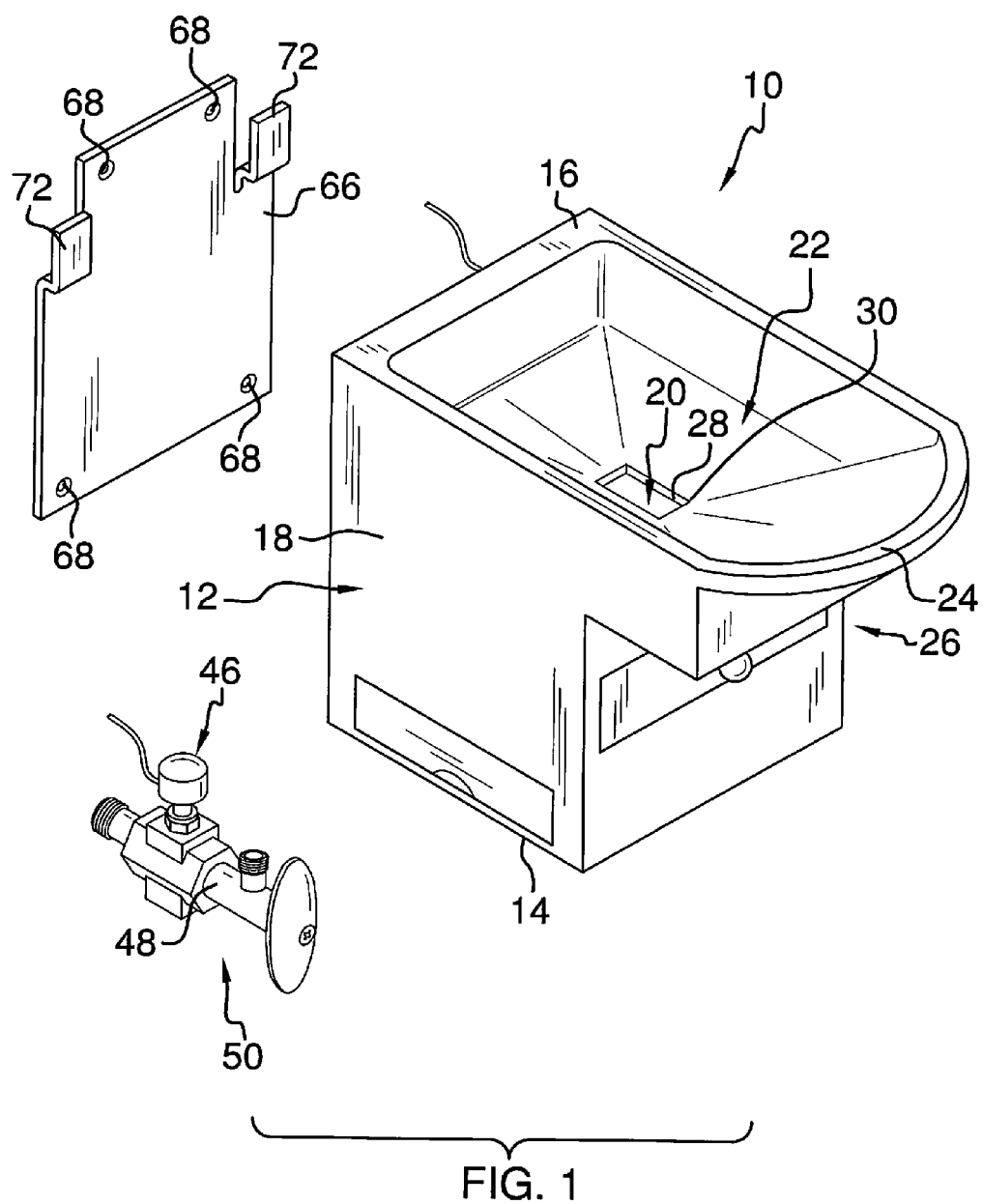
FIG. 1 is a top front side view of a leak detector assembly according to an embodiment of the disclosure.
Figure 2:
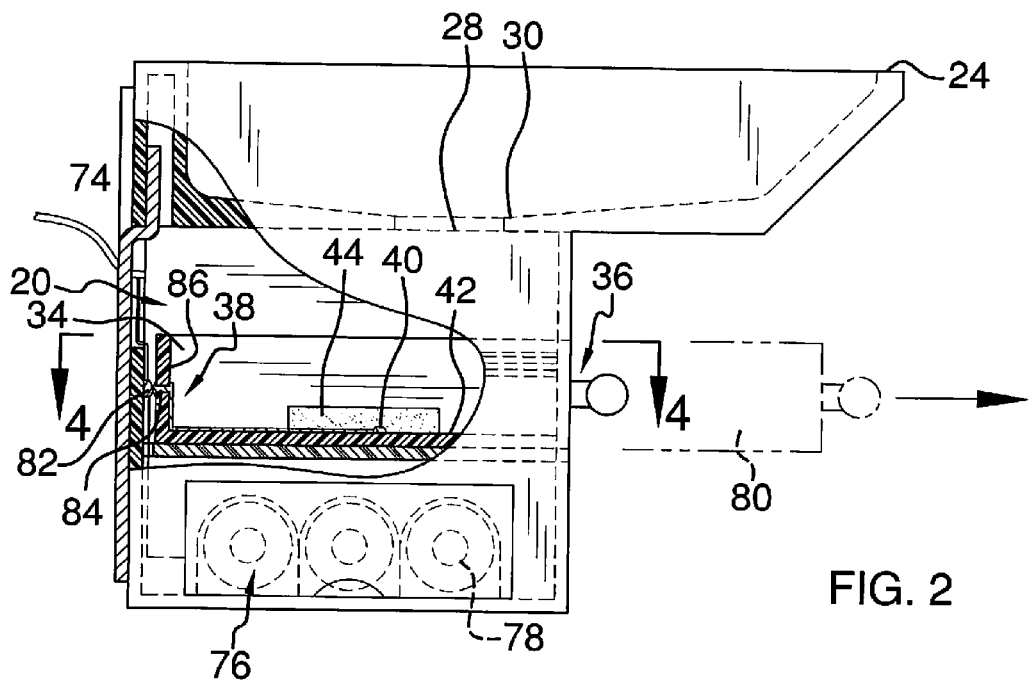
FIG. 2 is a partial cut-away side view of an embodiment of the disclosure.
Figure 3:
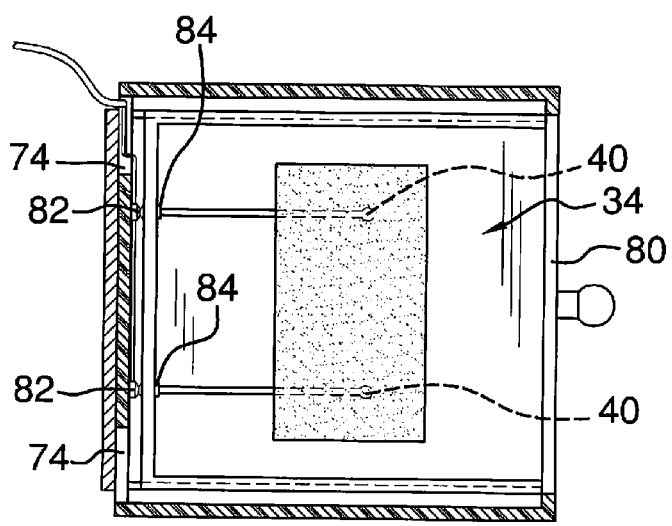
FIG. 3 is a cross-sectional view of an embodiment of the disclosure taken along line 3-3 of FIG. 2.

With reference now to the drawings, and in particular to FIGS. 1 through 8 thereof, a new leak detecting device embodying the principles and concepts of an embodiment of the disclosure and generally designated by the reference numeral 10 will be described.

As best illustrated in FIGS. 1 through 8, the leak detector assembly 10 generally comprises a housing 12 having a bottom 14, a top 16 and a perimeter wall 18 extending between the bottom 14 and the top 16 to define an interior space 20. A basin 22 is coupled to the top 16 of the housing 12 and may be integrally coupled to the top 16 of the housing 12. The basin 22 may have an arcuate forward lip 24 extending forwardly from a main section 26 of the housing 12. A drain opening 28 is positioned in the basin 22. The drain opening 28 is positioned at a base 30 of the basin 22 to prevent collection of fluid 32 in the basin 22 and facilitate passing the fluid 32 through the drain opening 28. A collection pan 34 is coupled to the housing 12. The collection pan 34 is positioned below the drain opening 22. Thus, the collection pan 34 is configured to collect fluid 32 passed through the drain opening 28 from the basin 22. The collection pan 34 may be slidably inserted into a drawer opening 36 in the perimeter wall 18 of the housing 12.

An electrical circuit 38 is coupled to the collection pan 34 and the housing 12. The electrical circuit 38 has a pair of spaced base contacts 40 positioned on a bottom face 42 of the collection pan 34. A sponge 44 or similar fluid retention device is coupled to the collection pan 34. The sponge 44 is positioned over and contacts the spaced base contacts 40 whereby the sponge 44 completes the electrical circuit 38 when the sponge 44 becomes sufficiently wet. A stop valve 46 is coupled to a fluid conduit 48 providing fluid 32 to a position over the basin 22. The fluid conduit 48 may be a section of pipe of an angle stop valve 50 positioned between a supply line 52 and a water supply 54.

Figure 4:
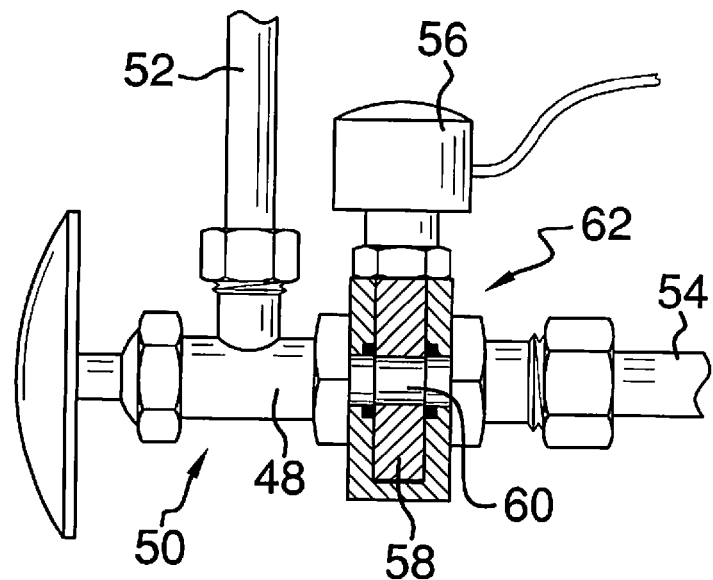
FIG. 4 is a cross-sectional view of an embodiment of the disclosure taken along line 4-4 of FIG. 1.
Figure 5:
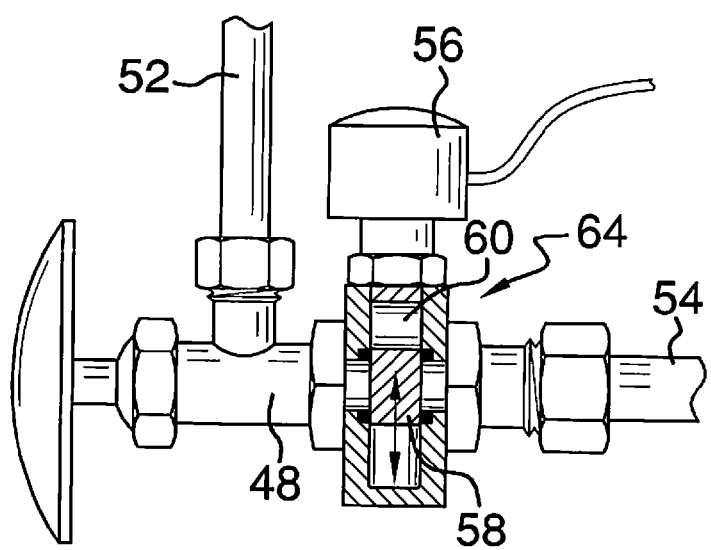
FIG. 5 is a cross-sectional view of an embodiment of the disclosure similar to FIG. 4 but with the valve in a closed position.
Figure 6:
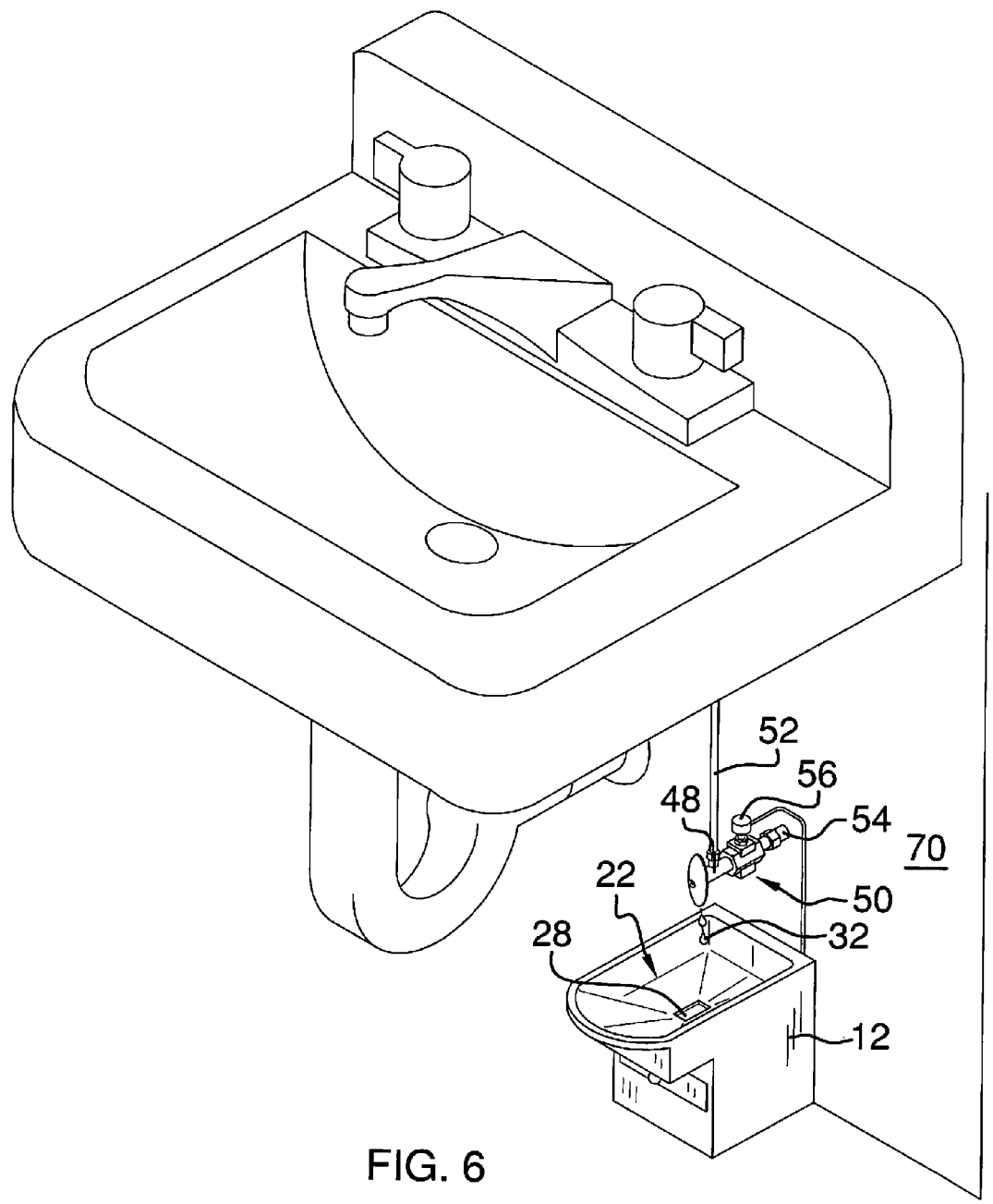
FIG. 6 is a top front side view of an embodiment of the disclosure in use.

The stop valve 46 is operationally coupled to the electrical circuit 38 whereby the stop valve 46 closes upon the electrical circuit 38 being completed. The stop valve 46 may have a solenoid switch 56 electrically coupled to the electrical circuit 38. The stop valve 46 has a rod 58 extending from the solenoid switch 56. The rod 58 has an aperture 60 configured for being aligned with the fluid conduit 48 when the stop valve 46 is in an open position 62 as shown in FIG. 4. The rod 58 further is configured for blocking the fluid conduit 48 when the stop valve 46 is in a closed position 64 as shown in FIG. 5.

A bracket 66 may be provided. A plurality of apertures 68 extend through the bracket 66 whereby the bracket 66 is configured for coupling to a support surface 70 facilitating positioning of the basin 22 directly below the angle stop valve 50. A pair of spaced tabs 72 extends from the bracket 66 and a pair of slots 74 is positioned in the perimeter wall 18 of the housing 12. The slots 74 receive the tabs 72 whereby the housing 12 is coupled to the bracket 66.

A power source 76 such as a battery 78 is coupled to and positioned in the housing 12. The power source 76 may be positioned in a drawer 80 slidably inserted into the housing 12 to facilitate changing of the battery 78. The power source 76 is electrically coupled to the electrical circuit 38 and the stop valve 46. More particularly, a pair of spaced wall contacts 82 is electrically coupled to the perimeter wall 18 of the housing 12 and the power source 76. A pair of spaced drawer contacts 84 is coupled to and extends through a rear wall 86 of the collection pan 34. The drawer contacts 84 are electrically coupled to the spaced base contacts 40. The drawer contacts 84 contact the wall contacts 82 when the collection pan 34 is fully inserted into the drawer opening 36 in the perimeter wall 18 of the housing 12.

Figure 7:
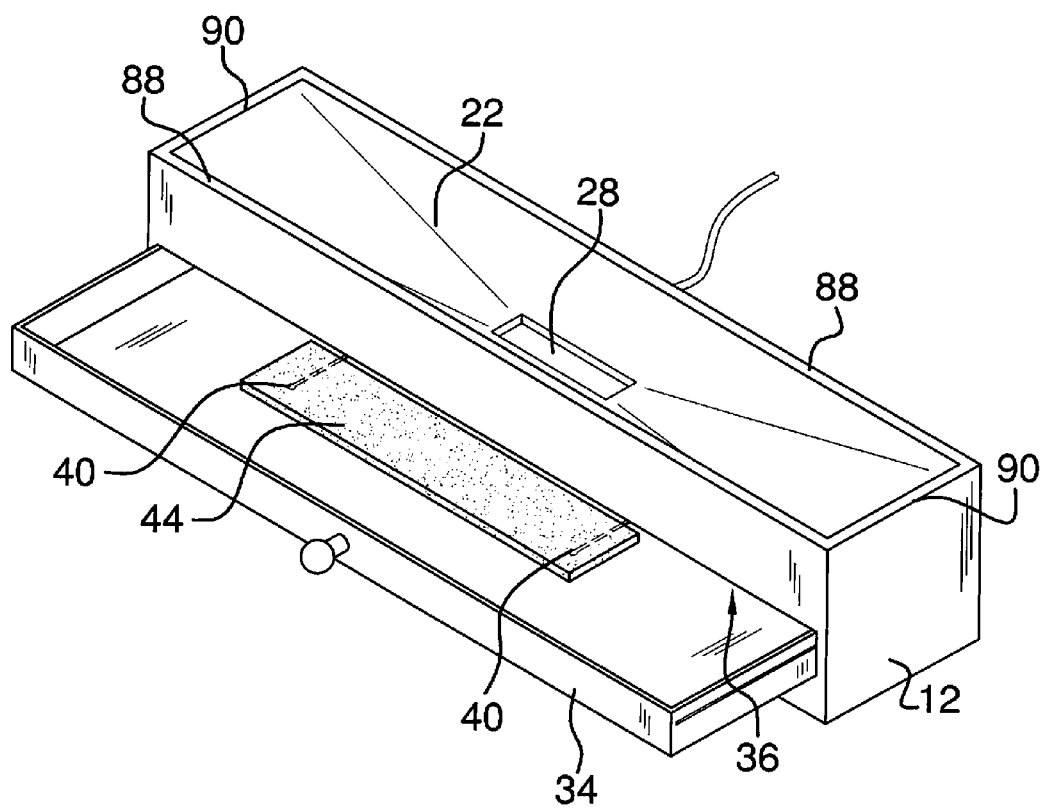
FIG. 7 is a top front side view of an embodiment of the disclosure.
Figure 8:
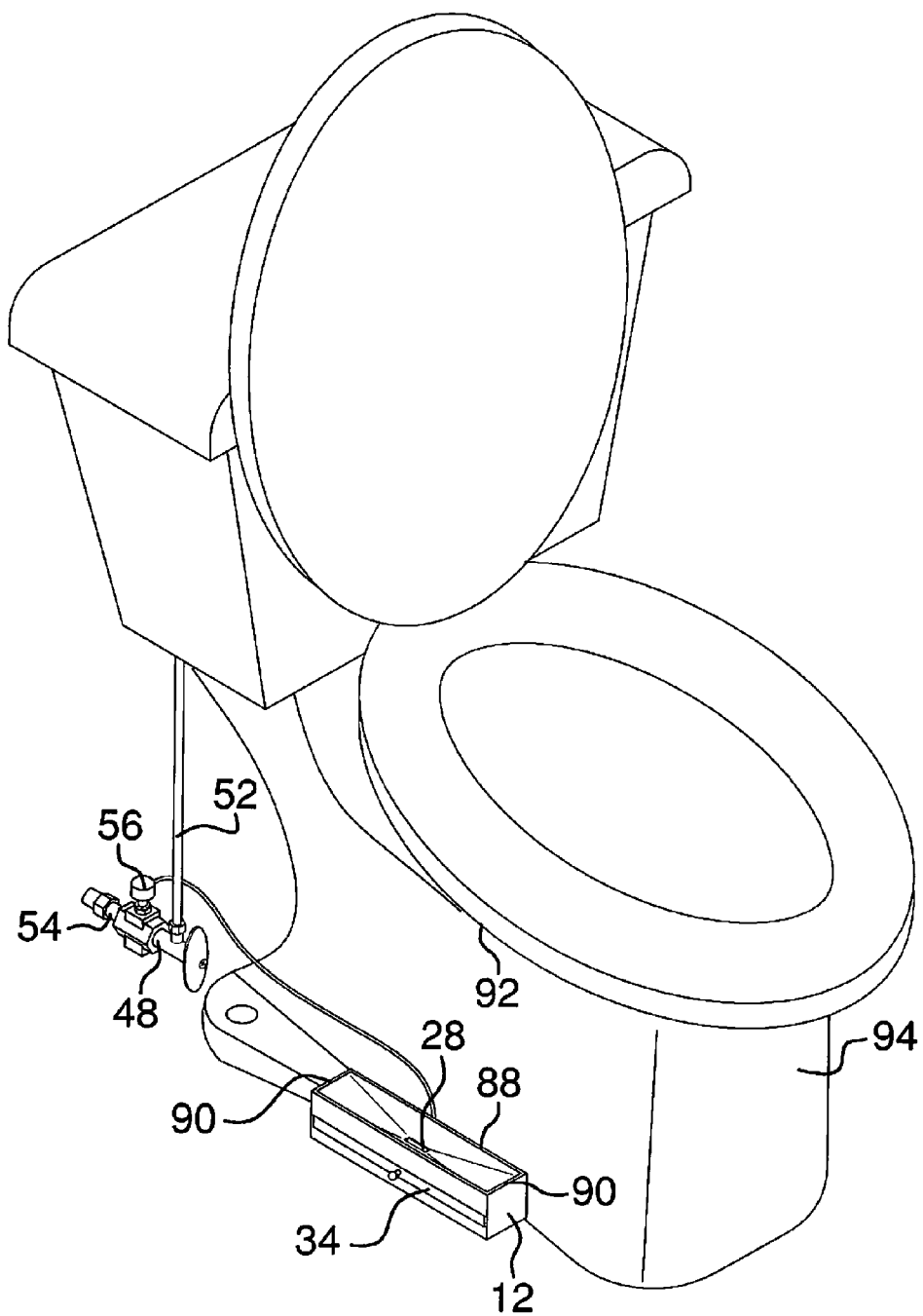
FIG. 8 is a top front side view of an embodiment of the disclosure in use.

In an embodiment shown in FIGS. 7 and 8, the perimeter wall 18 of the housing 12 may have a pair of long sides 88 and a pair of short sides 90 whereby the housing 12 has an elongated rectangular shape and is positionable below an edge 92 of a toilet bowl 94 to permit cutting off a water supply to a toilet upon detection of the toilet bowl 94 overflowing.

In use, the housing 12 is positioned as desired to facilitate collection of leaking or overflowing fluid 32 in the basin 22. The fluid 32 passes into the collection pan 34 where the fluid 32 is soaked into the sponge 44. Fluid 32 in the sponge 44 completes the electrical circuit 38 causing the stop valve 46 to shut off the source of the fluid 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A leak detector assembly comprising:
   a housing, said housing having a bottom, a top and a perimeter wall extending between said bottom and said top to define an interior space;
   a basin coupled to said top of said housing;
   a drain opening positioned in said basin;
   a collection pan coupled to said housing, said collection pan being positioned below said drain opening whereby said collection pan is configured to collect fluids passed through said drain opening from said basin;
   an electrical circuit coupled to said collection pan, said electrical circuit having a pair of spaced base contacts, said base contacts being positioned on a bottom face of said collection pan;
   a sponge coupled to said collection pan, said sponge being positioned over and contacting said spaced contacts whereby said sponge completes said electrical circuit when said sponge becomes wet; and
   a stop valve, said stop valve being coupled to a fluid conduit providing fluid to a position over said basin, said stop valve being operationally coupled to said electrical circuit whereby said stop valve closes upon said electrical circuit being completed.

2. The assembly of claim 1, further comprising:
   a bracket configured for coupling to a support surface;
   a tab extending from said bracket; and
   a slot positioned in said perimeter wall of said housing, said slot receiving said tab whereby said housing is coupled to said bracket.

3. The assembly of claim 1, further including said collection pan being slidably inserted into a drawer opening in said perimeter wall of said housing.

4. The assembly of claim 1, further including said drain opening being positioned at a base of said basin.

5. The assembly of claim 1, further including a power source coupled to and positioned in said housing, said power source being electrically coupled to said electrical circuit and said stop valve.

6. The assembly of claim 5, further comprising:
   said collection pan being slidably inserted into a drawer opening in said perimeter wall of said housing;
   a pair of spaced wall contacts electrically coupled to said perimeter wall of said housing and said power source;
   a pair of spaced drawer contacts coupled to and extending through a rear wall of said collection pan, said drawer contacts being electrically coupled to said spaced base contacts, said drawer contacts contacting said wall contacts when said collection pan is fully inserted into said drawer opening in said perimeter wall of said housing.

7. The assembly of claim 1, further including said stop valve having a solenoid switch electrically coupled to said electrical circuit.

8. The assembly of claim 7, further including said stop valve having a rod extending from said solenoid switch, said rod having an aperture configured for being aligned with the fluid conduit when said stop valve is in an open position, said rod further being configured for blocking the fluid conduit when said stop valve is in a closed position.

9. The assembly of claim 1, further including said perimeter wall of said housing having a pair of long sides and a pair of short sides whereby said housing has an elongated rectangular shape.

10. The assembly of claim 1, further including said perimeter wall of said housing having a pair of long sides and a pair of short sides whereby said housing has an elongated rectangular shape.

11. A leak detector assembly comprising:
    a housing, said housing having a bottom, a top and a perimeter wall extending between said bottom and said top to define an interior space;
    a basin coupled to said top of said housing;
    a drain opening positioned in said basin, said drain opening being positioned at a base of said basin;
    a collection pan coupled to said housing, said collection pan being positioned below said drain opening whereby said collection pan is configured to collect fluids passed through said drain opening from said basin, said collection pan being slidably inserted into a drawer opening in said perimeter wall of said housing;
    an electrical circuit coupled to said collection pan, said electrical circuit having a pair of spaced base contacts, said base contacts being positioned on a bottom face of said collection pan;
    a sponge coupled to said collection pan, said sponge being positioned over and contacting said spaced contacts whereby said sponge completes said electrical circuit when said sponge becomes wet;
    a stop valve, said stop valve being coupled to a fluid conduit providing fluid to a position over said basin, said stop valve being operationally coupled to said electrical circuit whereby said stop valve closes upon said electrical circuit being completed, said stop valve having a solenoid switch electrically coupled to said electrical circuit, said stop valve having a rod extending from said solenoid switch, said rod having an aperture configured for being aligned with the fluid conduit when said stop valve is in an open position, said rod further being configured for blocking the fluid conduit when said stop valve is in a closed position;
    a bracket;
    a plurality of apertures extending through said bracket whereby said bracket is configured for coupling to a support surface;
    a pair of spaced tabs extending from said bracket;

a pair of slots positioned in said perimeter wall of said housing, said slots receiving said tabs whereby said housing is coupled to said bracket;

a power source coupled to and positioned in said housing, said power source being electrically coupled to said electrical circuit and said stop valve;

a pair of spaced wall contacts electrically coupled to said perimeter wall of said housing and said power source; and a pair of spaced drawer contacts coupled to and extending through a rear wall of said collection pan, said drawer contacts being electrically coupled to said spaced base contacts, said drawer contacts contacting said wall contacts when said collection pan is fully inserted into said drawer opening in said perimeter wall of said housing.

\* \* \* \* \*